US012188292B2

(12) United States Patent

Zanin et al.

(10) Patent No.: US 12,188,292 B2
(45) Date of Patent: Jan. 7, 2025

(54) SAFE DOOR APPARATUS AND SYSTEM

(71) Applicant: NCR Atleos Corporation, Atlanta, GA (US)

(72) Inventors: Marcos Zanin, São Paulo (BR); Daniel Bim Gurati, São Caetano do Sul (BR); Marcel Canavesi Polo, Jundiaí (BR)

(73) Assignee: NCR Atleos Corporation, Atlanta, GA (US)

( * ) Notice: Subject to any disclaimer, the term of this patent is extended or adjusted under 35 U.S.C. 154(b) by 865 days.

(21) Appl. No.: 17/218,349

(22) Filed: Mar. 31, 2021

(65) Prior Publication Data

US 2022/0316262 A1 Oct. 6, 2022

(51) Int. Cl.

| | |
|---|---|
| ***E05G 1/04*** | (2006.01) |
| ***E05B 65/00*** | (2006.01) |
| ***G07D 11/125*** | (2019.01) |
| ***G07D 11/14*** | (2019.01) |
| ***G07D 11/40*** | (2019.01) |
| ***G07F 19/00*** | (2006.01) |

(52) U.S. Cl.

CPC ............ *E05G 1/04* (2013.01); *E05B 65/0075* (2013.01); *G07D 11/125* (2019.01); *G07D 11/14* (2019.01); *G07D 11/40* (2019.01); *G07F 19/202* (2013.01); *G07D 2211/00* (2013.01)

(58) Field of Classification Search

CPC ....... E05G 1/04; E05G 1/024; E05B 65/0075; E05B 17/2084; E05B 65/0082; G07D 11/125; G07D 11/40; G07D 11/14; G07D 2211/00; G07F 19/202; Y10T 70/7915; Y10T 70/7921

USPC ........................................................ 109/59 R

See application file for complete search history.

(56) References Cited

U.S. PATENT DOCUMENTS

| | | | | |
|---|---|---|---|---|
| 5,784,973 | A * | 7/1998 | Mercer | E05B 15/108 70/120 |
| 6,907,830 | B2 * | 6/2005 | Guinan | E05C 19/001 292/341.15 |
| 6,971,322 | B2 * | 12/2005 | DuBois | G07F 9/10 70/1.5 |
| 2012/0186086 | A1 * | 7/2012 | Tavares De Pinho | E05B 65/0082 29/897.34 |

FOREIGN PATENT DOCUMENTS

| | | | | |
|---|---|---|---|---|
| DE | 102009003341 | A1 * | 7/2010 | E05B 65/0075 |
| WO | WO-2004033835 | A1 * | 4/2004 | E05D 3/12 |
| WO | WO-2017203276 | A1 * | 11/2017 | G07D 11/12 |

* cited by examiner

*Primary Examiner* — Suzanne L Barrett

(74) *Attorney, Agent, or Firm* — Schwegman Lundberg & Woessner, P.A.

(57) ABSTRACT

In an embodiment, a safe door apparatus is provided. The apparatus comprises a locking apparatus affixed to an inside portion of a safe door for a safe and at least one vertically oriented bolt fastened to the inside portion of the safe door with the locking apparatus. The bolt is adapted to move with the locking apparatus during locking and unlocking of the safe door from a safe body of the safe. The bolt is further adapted to fasten and unfasten to a horizontal plate, which is affixed to an inside of the safe body during locking and unlocking of the safe door by the locking apparatus.

6 Claims, 10 Drawing Sheets

SAFE DOOR APPARATUS AND SYSTEM

BACKGROUND

Outdoor ATMs are convenient, but they have unique security concerns which indoor ATMs do not. For example, a determined thief may attempt to steal the whole ATM or steal the safe if the safe is successfully separated from the rest of the ATM. The ATM or safe is then transported to a remote location, and the thief attempts to blast the safe open or cut the safe door off. Thieves have become increasingly brazen in their attempts to access the ATMs' safes. Some thieves have even wrapped chains around the ATMs, affixed the other ends of the chains to their vehicles, and dragged the ATMs off.

Once a thief has an ATM or a safe of the ATM at a remote location, the thief attempts to cut or blast the safe door open to access the currency of the safe. Because safes of ATMs need to be able to receive currency for deposits and provide currency for withdrawals, the safe body of the safe typically includes a small opening (slit) through which the currency can be passed. Thieves exploit this opening to drop explosive devices inside the safe and blast it open from the inside out.

Moreover, a typical safe is designed to secure the safe door to the safe body around the perimeter of the safe door (the portion of the safe door that seals when closed to the safe body). Thieves are very aware of this design feature and exploit to their advantage. For example, a thief can use the perimeter of the safe as an edge to saw the door off with a powerful saw and saw blade. A thief may also or use the perimeter as leverage to pry the door off by wedging elements or hydraulic-based devices into a tiny crevasse and popping the door off.

SUMMARY

In various embodiments, a safe door apparatus, a safe and system are provided.

According to an aspect, a safe door apparatus is provided. The apparatus comprises a locking apparatus fastened to an inside portion of a safe door for a safe and at least one bolt fastened to the inside portion of the safe door with the locking apparatus. The at least one bolt is adapted to: move with the locking apparatus during locking and unlocking of the safe door; and fasten and unfasten the safe door to a plate affixed to an inside of a safe body for the safe during locking and unlocking by the locking apparatus of the safe door to the safe body.

DETAILED DESCRIPTION

As will be demonstrated more completely herein and below, a safe door apparatus, a safe, and a system are provided for improving the blast tolerance of the safe and safe door during an explosive event. The safe door apparatus comprises two additional vertical bolts adapted to be integrated with an existing safe locking/unlocking mechanism and pass through apertures in a horizontal plate of the safe body. This provides added rigidity and force resistance to the safe door, such that when the safe door is locked and a thief attempts to drop an explosive into a small media opening of the safe (used by a connected depository or recycler for managing valuable media deposited and withdrawn from the safe), the safe remains intact and the safe door remains closed.

Furthermore, the bolts are entirely contained within the safe door, which provides added protection against thieves attempting to cut or to pry the safe door open around the perimeter of the door and the safe body. Any cutting and prying attempts will fail because the bolts only engage the horizontal plate of the safe body on an inside portion of the safe that is not along the perimeter of the door. A safe door engages and locks by affixing the perimeter of the safe door to the safe body. The safe door apparatus adds an additional engagement and locking mechanism that is not based on and does not engage the safe body along the perimeter of the door. Thieves will be largely unaware of this added layer of protection and will be unable to pry or blast off the safe door such that their cutting techniques will be in vain. Even if the entire perimeter of the safe door is sawed through, the safe door will remain closed with the safe door apparatus presented herein and below.

Figure 1:
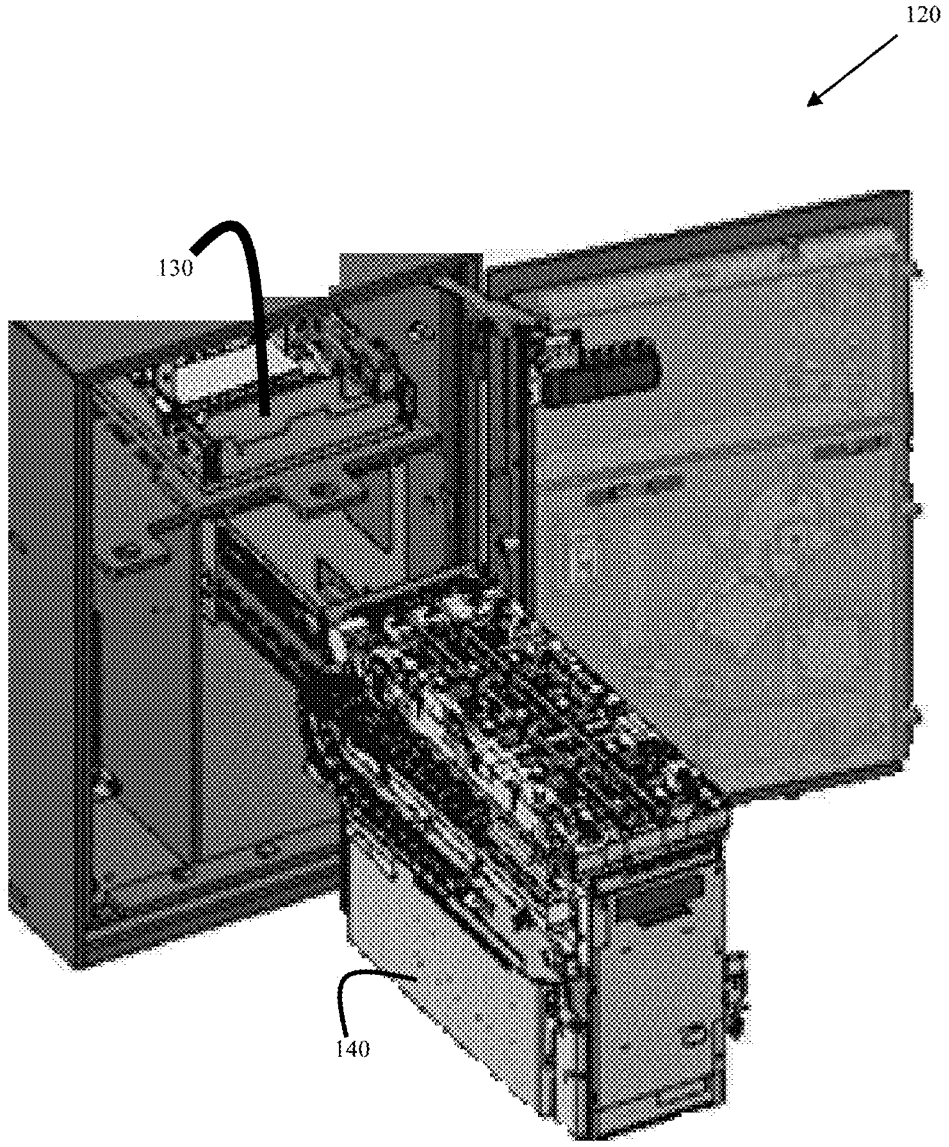
FIG. 1 is a diagram a safe, according to an example embodiment.

FIG. 1 is a diagram depicting an opened safe 120 comprising a novel safe door apparatus. It is to be noted that safe 120 is shown with only those components relevant to understanding what has been added and modified for purposes of providing the safe door apparatus.

Safe 120 comprises a cassette infeed module 130 and cassette modules 140. When safe 120 is attached/interfaced to a depository/recycler 110, shown in FIG. 2, system 100 is formed.

Figure 2:
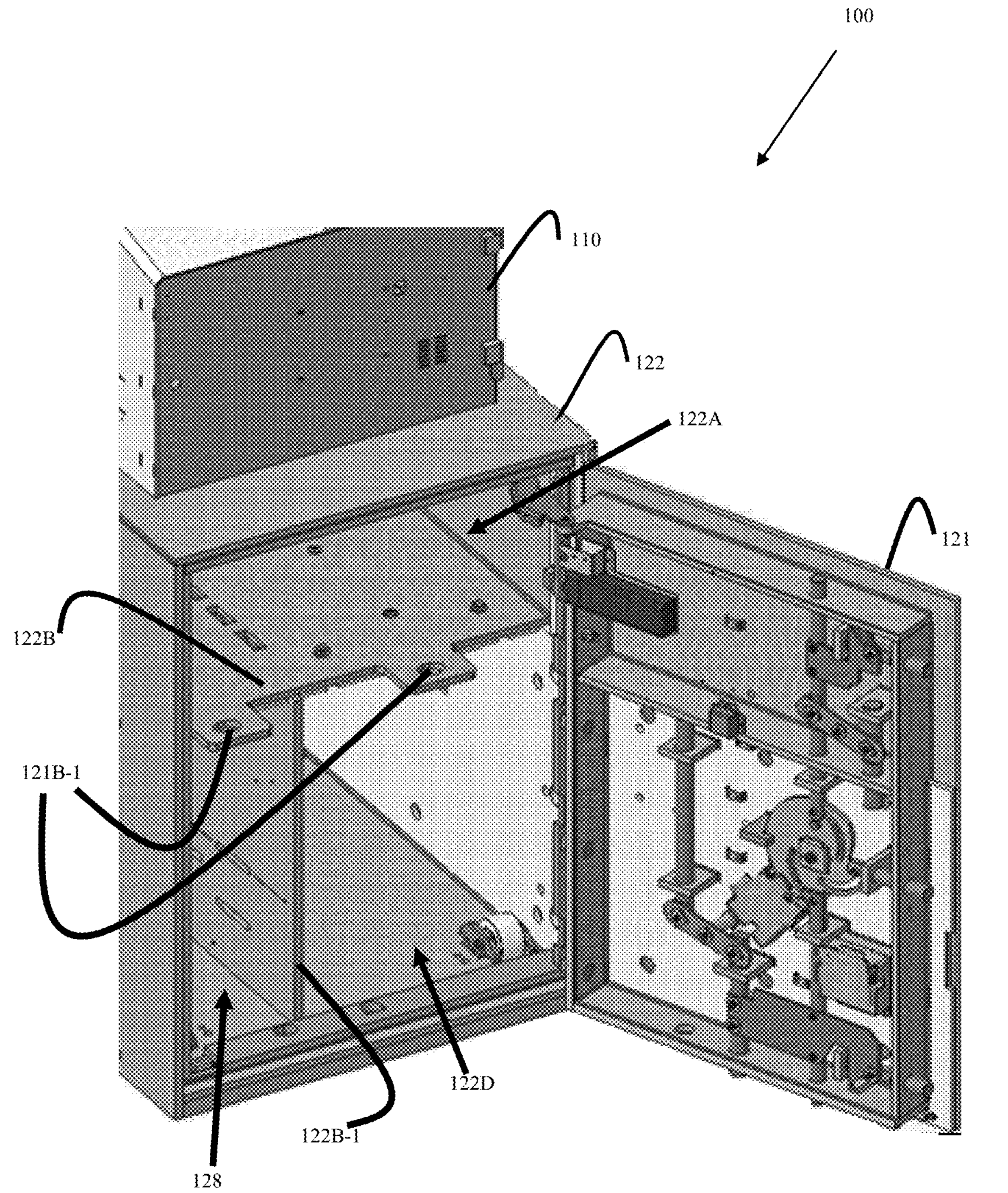
FIG. 2 is a diagram a system, according to an example embodiment.

System 100 (as shown in FIGS. 1 and 2) comprises safe 120, cassette infeed module 130, cassette modules 140, and depository/recycler 110.

It is to be noted that depository 110 may also be a recycler 110. System 100 may be further integrated into a transaction terminal, such as an Automated Teller Machine (ATM), a Self-Service Terminal (SST), a Point-Of-Sale (POS) terminal, or a kiosk.

Safe 120 comprises a safe door 121 and a safe body (housing) 122. Inside of safe body 122 three areas are depicted an infeed compartment 122A, a media cassette compartment 122D, and a check compartment 128. Horizontal plate 122B and vertical plate 122B-1 are arranged inside safe body 122 to form compartments 122A, 122D, and 128.

Figure 3:
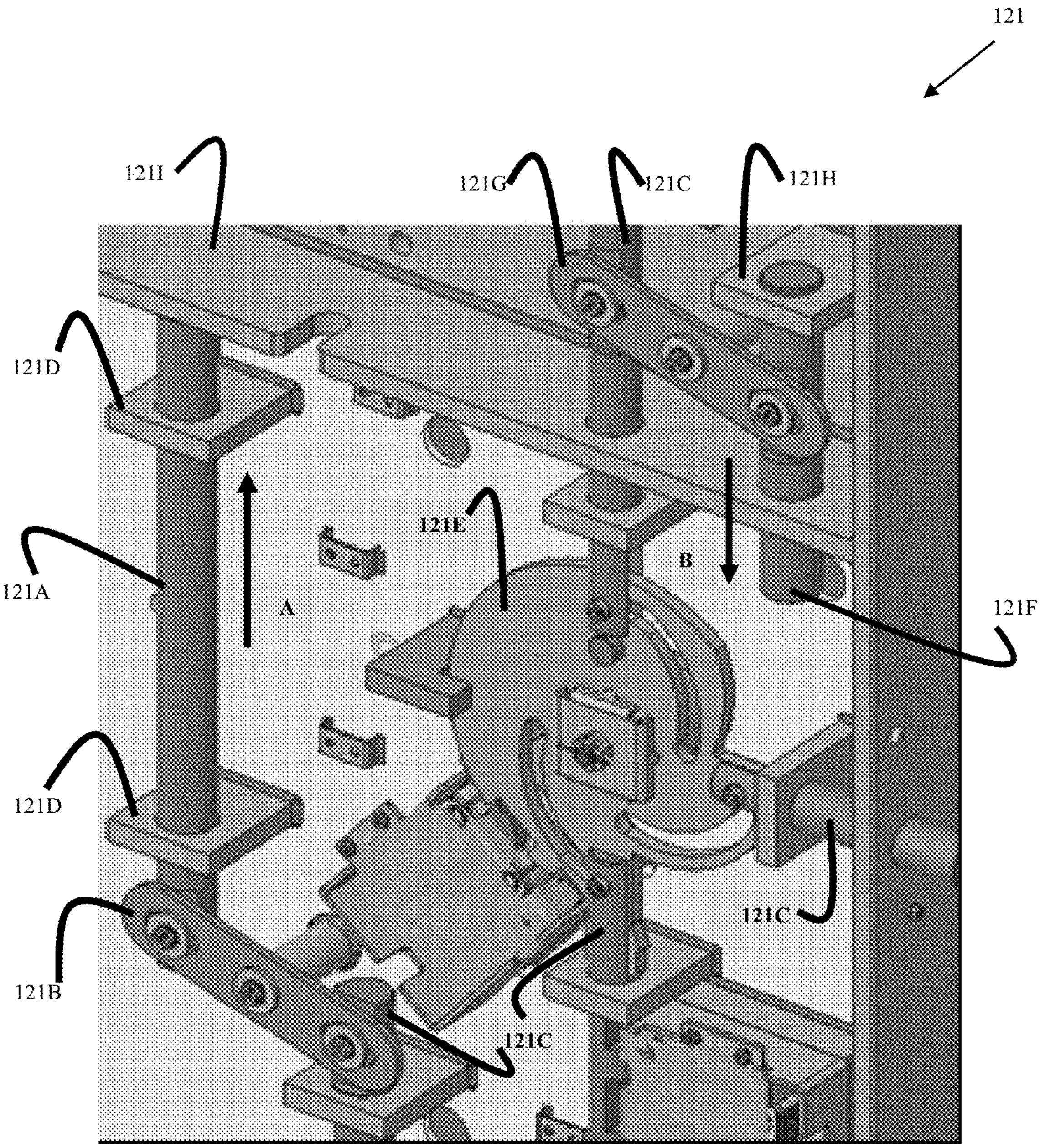
FIG. 3 is a diagram depicting a safe door apparatus, according to an example embodiment.

FIG. 3 illustrates a safe door apparatus located on an inside portion of safe door 121. Safe door apparatus comprises safe locking mechanism 121E using bolts 121C and at least two additional novel vertically oriented (vertical) bolts 121A and 121F. A first vertical bolt 121A is securely adhered to an inside surface of safe door 121 by welded metal holding brackets 121D. Each bracket 121D comprising an aperture through which first vertical bolt 121A is inserted through. One end of first vertical bolt 121A is fastened to a first connection plate 121B. First connection plate 121B is affixed on one end to the corresponding end of first vertical bolt 121A and opposite end of first connection plate 121B is fastened to a top end of an existing bolt 121C associated with locking mechanism 121E, such that locking mechanism 121E is rotated to open or close safe door 121, first vertical bolt 121A moves in a vertical path direction up and down through apertures of brackets 121D. Ranges of vertical motion for first vertical bolt 121A is restricted by the size of connection plate 121B and a horizontal shelf 121I through which first vertical bolt 121A cannot pass through or above (an opposite end of bolt 121A from the end fastened to connection plate 121B is obstructed and impeded during vertical movement by horizontal shelf 121I).

Second vertical bolt 121F is fastened to safe door 121 via a welded steel holding plate 121H. Plate 121H comprises an aperture that allows bolt 121F to move vertically when existing bolt 121C is moved via connection plate 121G, which is fastened to a front middle portion of bolt 121F. Existing bolt 121C is fastened on one end to locking mechanism 121E, such that when locking mechanism 121E is moved to open or close safe 120, connection plate 121G causes bolt 121F to move vertically upward or downward. Shelf 121I comprises at least two apertures through which existing bolt 121C and second vertical bolt 121F are able to pass through shelf 121I during movement caused by lock mechanism 121E.

Arrow "A" in FIG. 3 shows the direction of movement (upward and vertical) for first bolt 121A when locking mechanism 121E is rotated to lock safe door 121 of safe 120. Arrow "B" shows the direction of movement (downward and vertical for second bolt 121F when locking mechanism 121E is rotated to lock safe door 121 of safe 120. During safe locking connection plate 121B causes first vertical bolt 121A to move vertically up ("A") through the apertures of holding plates 121D while simultaneously connection plate 121G causes second vertical bolt 121F to move vertically down ("B") through an aperture in shelf 121I. Opening or unlocking the safe causes first vertical bolt 121A to move down vertically ("B") and causes second vertical bolt 121F to move up vertically ("A"). Vertical bolts 121A and 121F move in opposite directions to one another during safe unlocking and safe locking.

Figure 4:
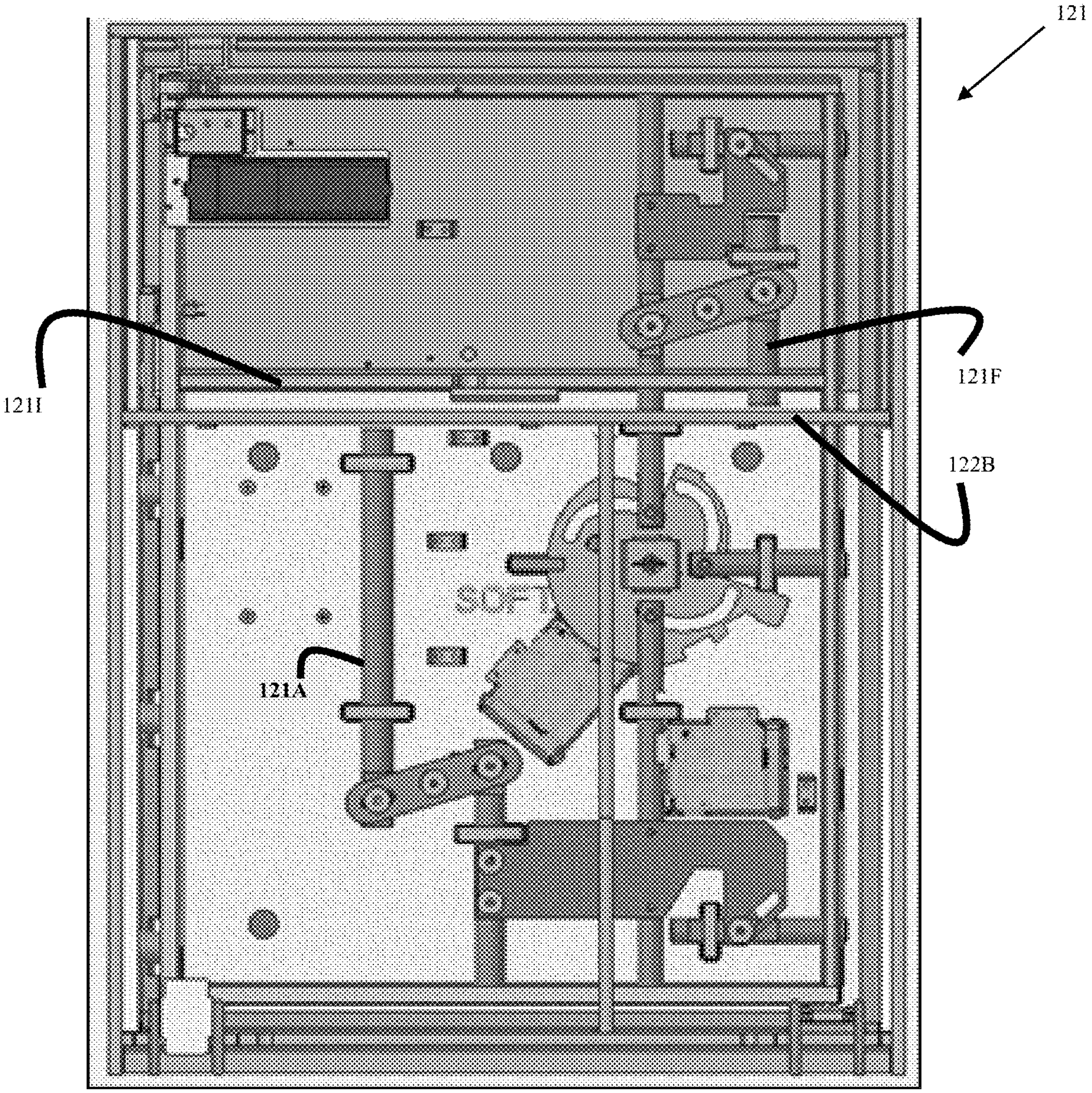
FIG. 4 is a diagram depicting the safe door apparatus in a closed and unlocked condition, according to an example embodiment.

FIG. 4 illustrates the safe 120 with safe door 121 closed and safe door 121 in an unlocked condition or state. A portion of horizontal plate 122B from safe body 122 is oriented under horizontal shelf 121I with safe door 121 closed. Horizontal plate 122B comprises two apertures 122B-1 (illustrated in FIG. 2) for which first vertical bolt 121A sits below and for which second vertical bolt 121F sits above when safe door 121 is closed an in an unlocked condition or state.

Figure 5:
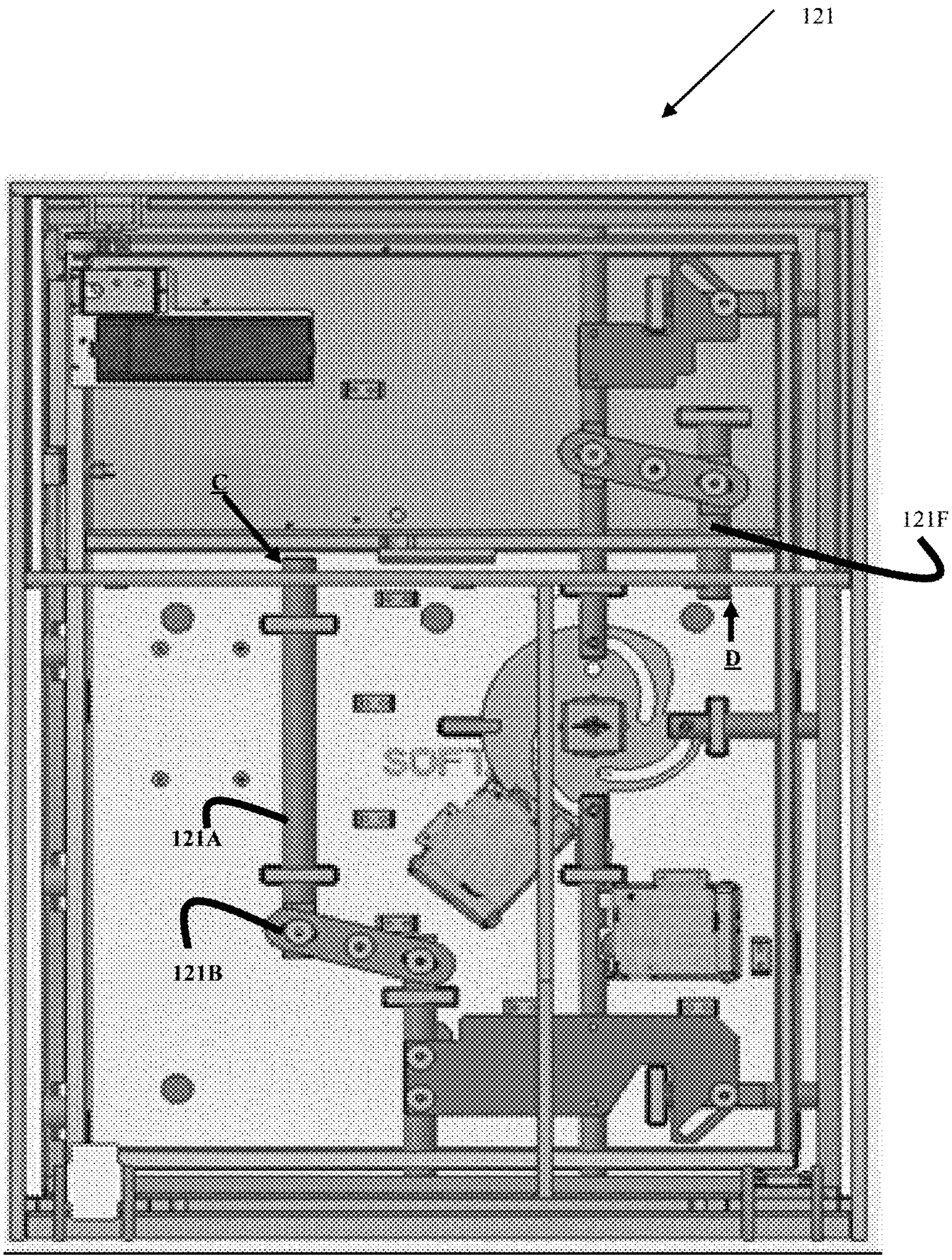
FIG. 5 is a diagram depicting the safe door apparatus in a closed and locked condition, according to an example embodiment.

FIG. 5 illustrates the safe 120 with safe door 121 closed and safe door 121 in a locked condition or state. First vertical bolt 121A is driven vertically upward ("A") by movement caused by lock mechanism 121E to the corresponding existing bolt 121C (moving first vertical bolt 121A via connection plate 121B). This drives a top portion of first vertical bolt 121 through a first aperture 122B-1 of horizontal plate 122, such that the top portion extends above horizontal plate 122 (as illustrated by "C" in FIG. 5). Concurrently, locking mechanism 121E moves the corresponding existing bolt 121C, which drives second vertical bolt 121F (via connection plate 121G) through a second aperture 122B-1 of horizontal plate 122, such that the bottom portion of second vertical bolt 121F extends below horizontal plate 122 (as illustrated by "D" in FIG. 5).

Figure 6:
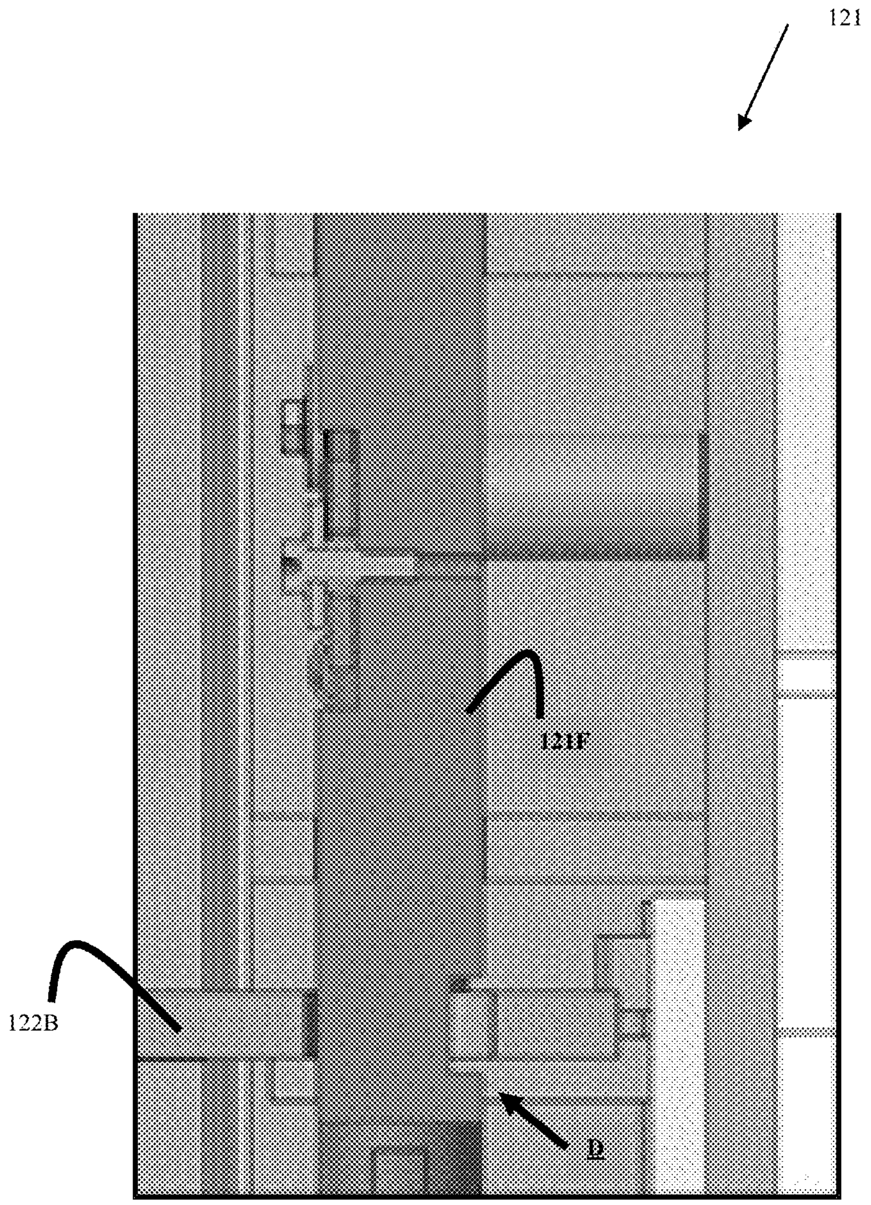
FIG. 6 is a diagram depicting a cross-sectional of a portion of the safe door apparatus in a locked condition, according to an example embodiment.

FIG. 6 illustrates a cross-sectional or cut away view of second vertical bolt 121F extending below a bottom portion of horizontal plate 122B ("D") when safe door 121 closed and safe door 121 in a locked condition or state.

Vertical movement of both bolts 121A and 121F occur concurrently and are driven by corresponding movement in lock mechanism 121E. Furthermore, the bolts 121A and 121F move in opposite directions from one another. Bolt 121A moves upward to move safe door 121 to a lock condition or state while bolt 121F simultaneously or concurrently moves downward; the movements are in opposite directions when safe door 121 is moved to an unlocked condition or state (bolt 121A moves downward while bolt 121F moves upward. When safe door 121 is locked, both bolts 121A and 121F pass through apertures 122B-1 and extend beyond a top surface of horizontal plate 122 for bolt 121A and extend below a bottom surface of horizontal plate 122 for bolt 121F.

Figure 7:
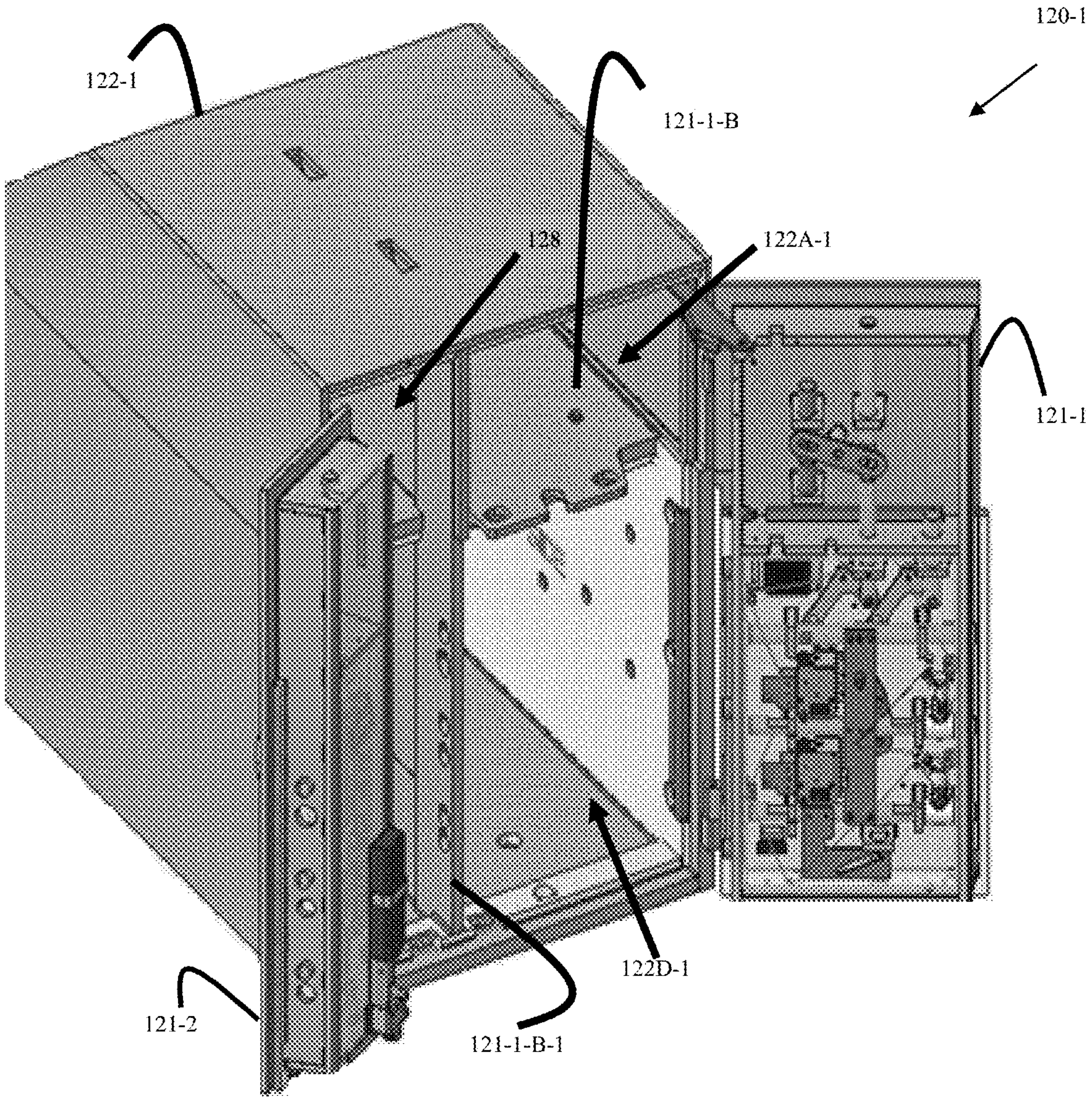
FIG. 7 is a diagram depicting another safe, according to an example embodiment.

FIG. 7 illustrates a different type of safe 120-1 associated with recycler modules. Safe 120-1 comprises a safe body 122-1 and two safe doors (121-1 and 121-2). Door 121-1 when opened provides access to media chamber 122D-1 and media infeed chamber 122A-1 and when safe door 121-2 is opened access is provided to check chamber 128. Chambers 122A-1, 122D-1, 128 are defined by horizontal plate 121-1-B and vertical plate 121-1-B-1.

Figure 8:
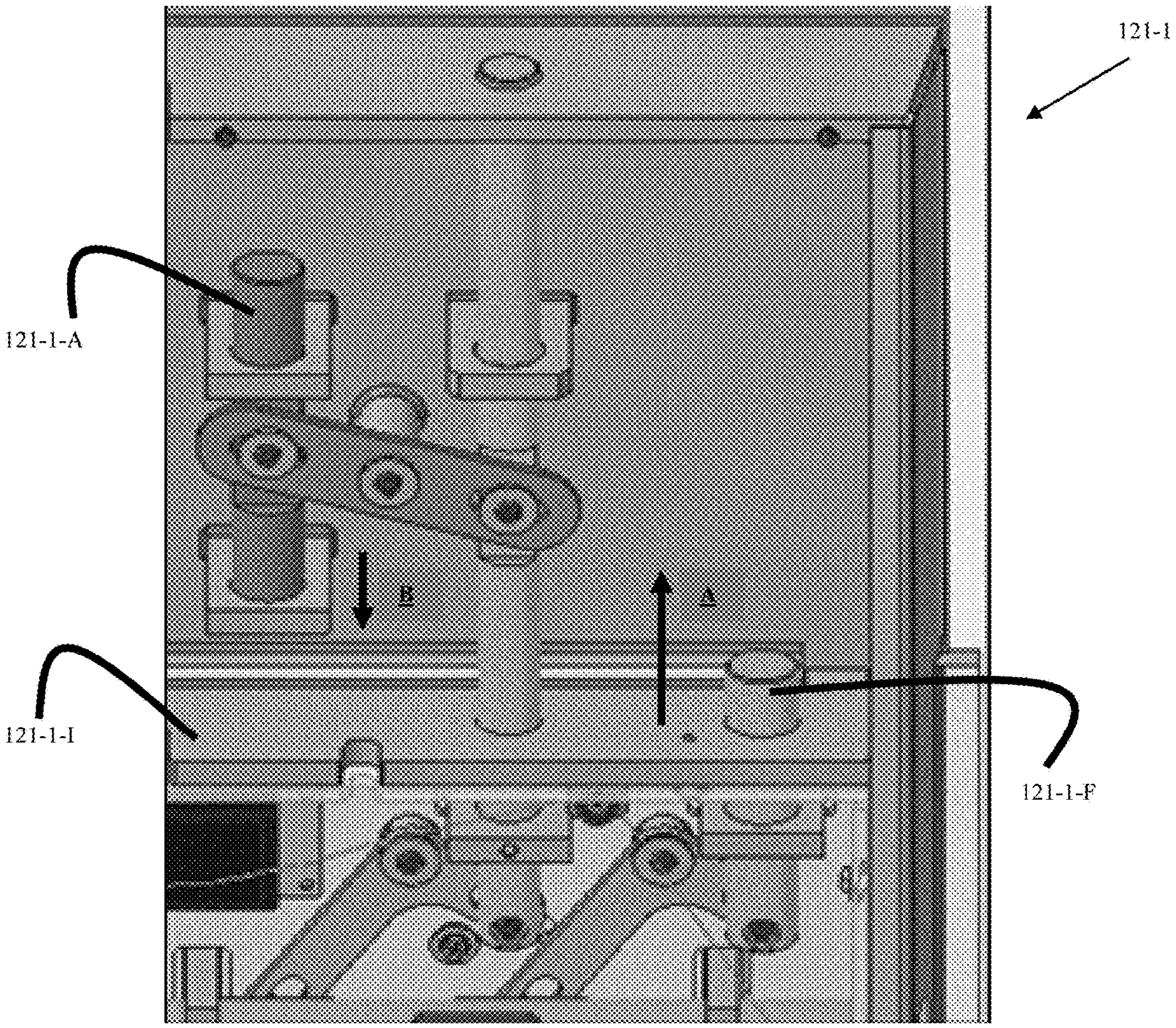
FIG. 8 is a diagram depicting a safe door apparatus of the safe shown in FIG. 7, according to an example embodiment.

FIG. 8 illustrates a modified safe door apparatus to accommodate the recycler type safe 120-1 and its door configuration. Specifically, first vertical bolt 121-1-A is situated above horizontal shelf 121-1-I (in previous embodiments for a depository-based safe 120 first vertical bolt 121A was situated below horizontal shelf 121I). First vertical bolt 121-1-A is also substantially the same length as second vertical bolt 121-1-F (in previous embodiments for a depository-based safe 120 first vertical bolt 121A was substantially longer in length than second vertical bolt 121F). Second vertical bolt 121-1-F is situated below horizontal shelf 121-1-I (in previous embodiments for a depository-based safe 120 second vertical bolt 121F was situated above horizontal shelf 121I). Moreover, the lock directions are changed for the recycler-based safe, such that during a lock of safe door 121-1 first vertical bolt 121-1-A moves downward ("B") while second vertical bolt 121-1F moves upward ("A"); this was the opposite for the depository-based safe where first vertical bolt 121A moves upward ("A") while second vertical bolt 121F moves downward ("B")) during a lock of safe door 121.

Figure 9:
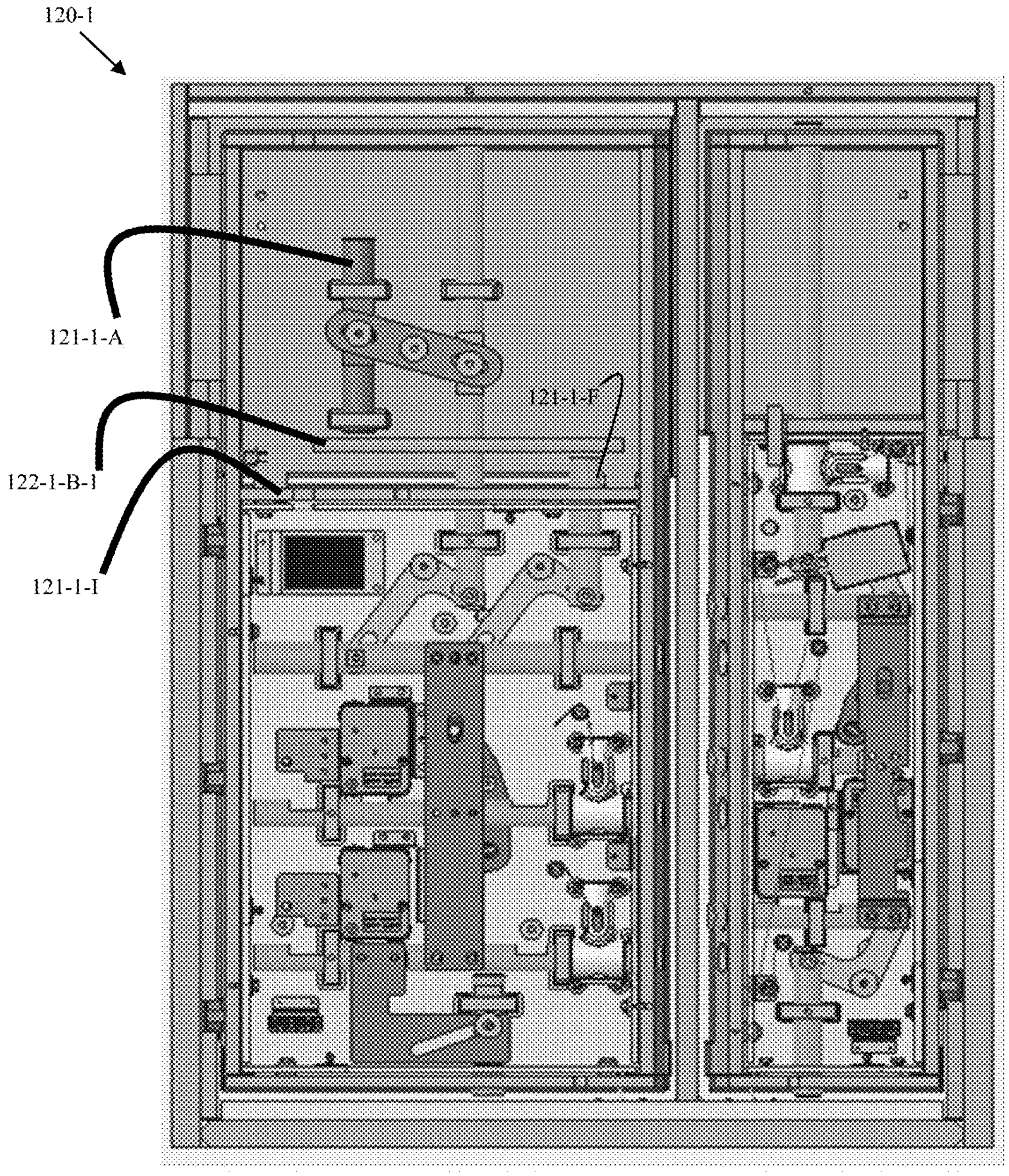
FIG. 9 is a diagram depicting the safe door apparatus for the safe shown in FIG. 7 in a closed and unlocked condition, according to an example embodiment.

FIG. 9 shows the recycler-based safe doors 121-1 and 121-2 closed and in an unlocked condition or state. Horizontal plate 122-1-B-1 is situated above horizontal shelf 121-1-I (in the depository-based safe embodiments, this was the opposite with horizontal plate 122B situated under horizontal shelf 121I when safe 120 was in a closed state). Notice a bottom of first vertical bolt 121-1-A is elevated slightly above horizontal plate 122-1-B-1 while second vertical bolt 121-1-F is positioned slightly below horizontal plate 122-1-B-1 (again, this orientation for a closed position of safe doors 121-1 and 121-2 is opposite the orientation that was discussed above for safe door 121 and safe 120).

Figure 10:
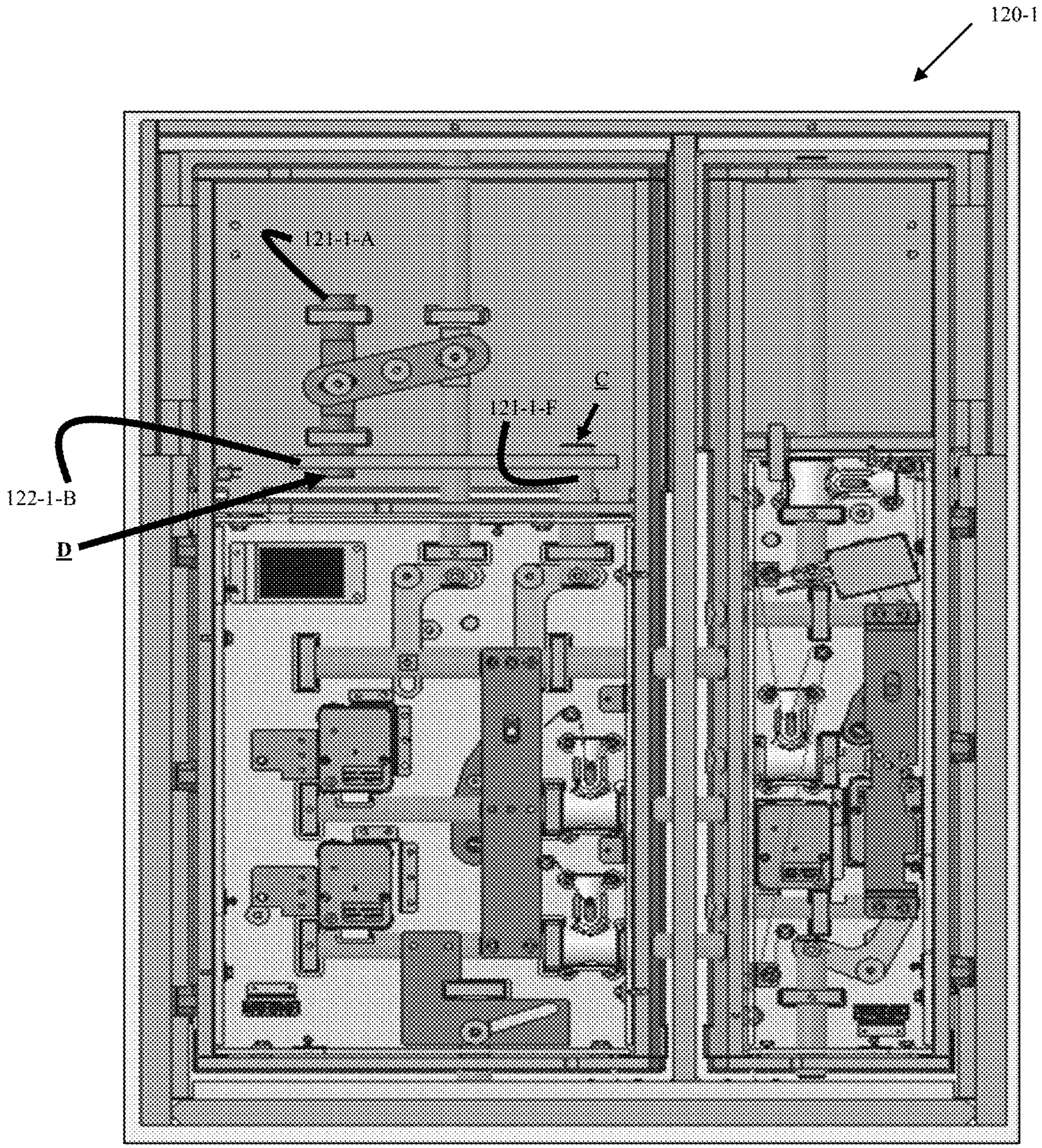
FIG. 10 is a diagram depicting the safe door apparatus for the safe shown in FIG. 7 in a closed and locked condition, according to an example embodiment.

FIG. 10 shows the recycler-based safe doors 121-1 and 121-2 closed and in a locked condition or state. First vertical bolt 121-1-A passes through a corresponding aperture in horizontal plate 122-1-B and extends below a bottom surface of plate 122-1-B while second vertical bolt 121-1-F passes through a corresponding aperture in plate 122-1-B and extends above a top surface of plate 122-1B.

In an embodiment, the safe door apparatus is adapted for safes comprising more than two doors (such as safes with dedicated doors to each internal chamber.

In an embodiment, vertical bolts 121A, 121-1A, 121F, and 121-1-F are approximately 30-millimeter (mm) steel bolts.

In an embodiment, horizontal plate 122B and vertical plate 122-1-B-1 are additional steel plates that are added to reinforce an existing steel horizontal plate and existing vertical plate for the safes 120 and 120-1. Added plates 122B and 122-1-B-1 are approximately 10 mm in thickness, which is added to the existing steel plates having approximately ½ inch in thickness. This provides approximately 22.7 mm (nearly a full inch) in steel thickness providing enhanced rigidity and force resistance.

In an embodiment, the safe door apparatus is integrated into a system 100 comprising an ATM. The ATM comprises a depository 110 or a recycler 110 that deposits and withdraws currency from currency cassettes 140 through a currency infeed module 130 and a small slit in one side of the safe body 122 for the currency to pass through.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A safe, comprising:

a safe body comprises a steel plate fastened on an inside of the safe body:

a safe door comprises an inside surface;

a locking and unlocking mechanism fastened to the inside surface of the safe door and adapted to lock and to unlock the safe door to and from the safe body; and two steel bolts fastened to the inside surface of the safe door and adapted to move with the locking and unlocking mechanism during locking and unlocking of the safe door by fastening and unfastening the inside surface of the safe door to the steel plate;

wherein the steel plate comprises two apertures adapted to allow portions of the two bolts to pass through when the locking and unlocking mechanism locks the safe door to the safe body;

wherein the steel plate is horizontally fastened within the inside of the safe body with the two apertures aligned with and adjacent to the two bolts when the safe door is closed;

wherein the two bolts are adapted to move vertically during locking of the safe door to the safe body with a first portion of a first bolt extending through a first aperture of the steel plate and above a top surface of the steel plate and with a second portion of a second bolt extending through a second aperture of the steel plate and below a bottom surface of the steel plate.

2. The safe of claim 1 further comprising, the safe body further comprises a second steel plate fastened to the inside of the safe body, wherein the steel plate is horizontally situated within the inside of the safe body and the second steel plate is vertically situated within the inside of the safe body.

3. The safe of claim 2, wherein an arrangement of the steel plate and the second steel plate defines within the inside of the safe body a media infeed compartment, a media cassette compartment, and a check compartment.

4. The safe of claim 3, wherein the safe further comprises a second safe door, wherein the second safe door provides access to the check compartment when opened and the safe door provides access to media infeed compartment and the media cassette compartment when opened.

5. A safe, comprising:

a safe body comprises a steel plate fastened on an inside of the safe body:

a safe door comprises an inside surface;

a locking and unlocking mechanism fastened to the inside surface of the safe door and adapted to lock and to unlock the safe door to and from the safe body; and two steel bolts fastened to the inside surface of the safe door and adapted to move with the locking and unlocking mechanism during locking and unlocking of the safe door by fastening and unfastening the inside surface of the safe door to the steel plate;

wherein a first bolt of the two bolts is adapted to vertically move in a first direction to pass through a first aperture of the steel plate during locking of the safe door to the safe body, and wherein a second bolt of the two bolts is adapted to vertically move in an opposite direction to the first direction and pass through a second aperture of the steel plate during locking of the safe door to the safe body.

6. The safe of claim 1, wherein the steel plate comprises two extended members, each extended member comprising an aperture, each aperture aligned with and adjacent to one of the two bolts when the safe door is closed against the safe body.

* * * * *